Patented June 12, 1934

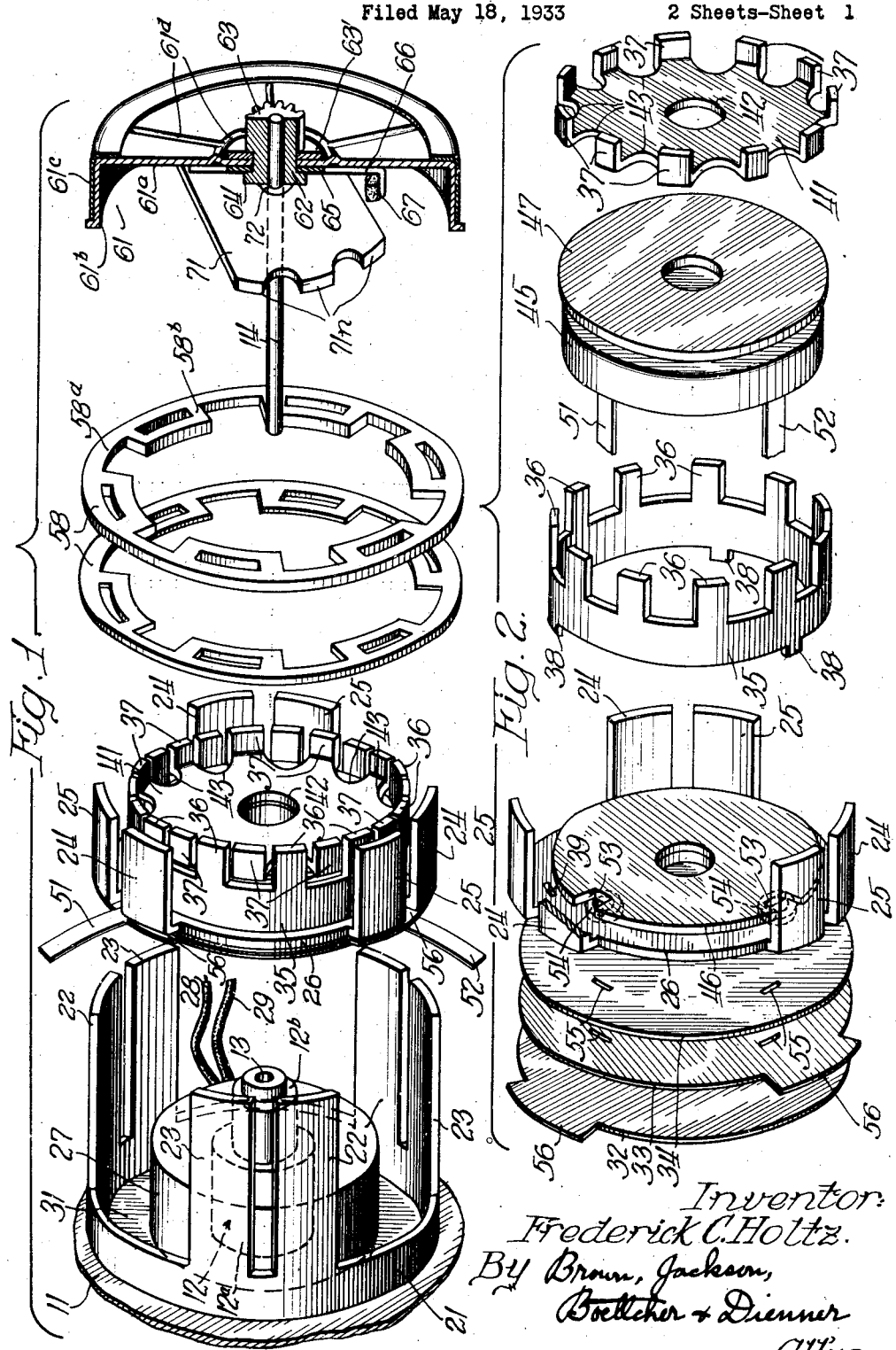

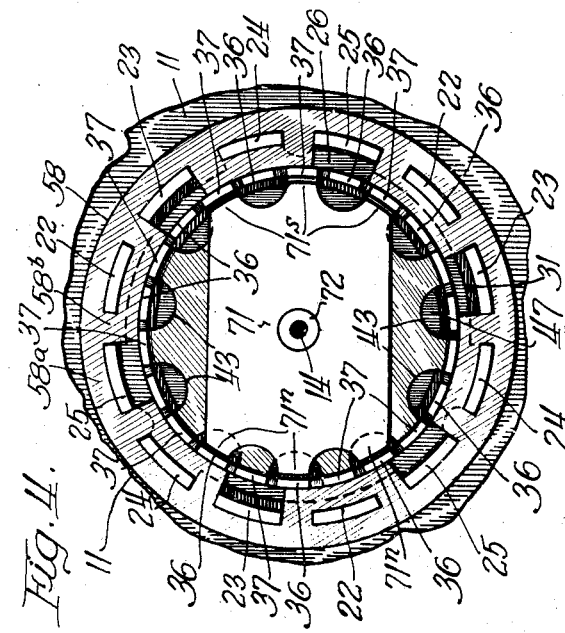
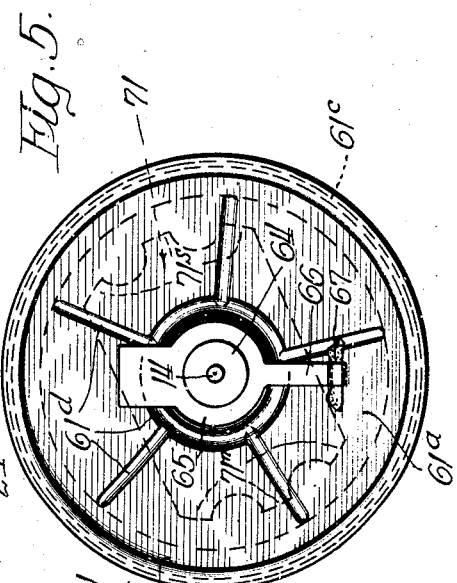
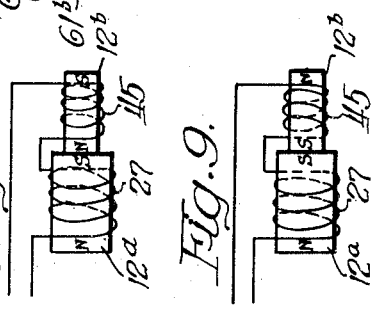
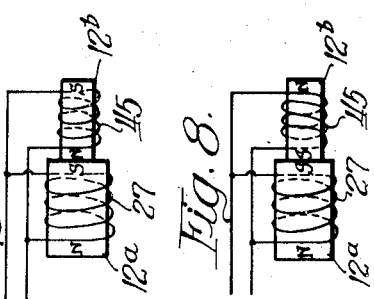

1,962,770

UNITED STATES PATENT OFFICE 1,962,770

ELECTRIC MOTOR

Frederick C. Holtz, Springfield, Ill., assignor to Sangamo Electric Company, Springfield, Ill., a corporation of Illinois Application May 18, 1933, Serial No. 671,651

11 Claims. (Cl. 172—275)

The present invention relates to electric motors, and more particularly to self-starting synchronous motors for use on single phase alternating current. In the illustrated embodiment, I have shown my invention embodied in a small size motor such as would have particular utility for operating electric clocks, time switches, etc., although I wish it to be understood that the invention is also capable of practical embodiment in larger size motors.

The motor of my invention comprises two rotors, one for starting the motor and the other for causing the motor to run in synchronism with the alternating current supply. The self-starting rotor is preferably an induction rotor responding to a shifting or rotating flux field, although other self-starting principles may be used, represented, for example, by conventional series and shunt commutator motors, repulsion induction motors, etc. The synchronous rotor is preferably of the permanent magnet type responding to a stationary axis alternating magnetic field.

The general object of the invention is to provide an improved and simplified motor construction in which the rotating field which induces the starting of the motor is created by one coil, and the stationary axis alternating field which compels the motor to run at synchronism is created by a separate coil. By employing two separate coils to create these different magnetic fields, the strength of each field may be relatively proportioned for more satisfactory operation. For example, at the time of starting, the permanent magnet synchronous rotor has a certain standstill locking torque, and the rotating field acting on the induction rotor element must be so proportioned as to develop sufficient starting torque to overcome the standstill locking torque of the synchronous rotor. Also, as the synchronous rotor element approaches or comes into synchronism, the strength of the alternating field must be such as to hold the synchronous rotor at synchronous speed notwithstanding any tendency of the induction rotor to carry the rotor assembly beyond this predetermined synchronous speed. The use of the two separate energizing coils for creating these magnetic fields enables the strength of each field to be more conveniently proportioned for securing the above described operation.

Another object of the invention is to provide a motor of the above general description having an improved structural arrangement and grouping of the stator poles and of the rotors to the end of providing a motor of very compact dimensions, which is an important feature for use in clocks, time switches, etc.

Other objects and advantages of the invention will appear from the following detail description of a preferred embodiment thereof. In the accompanying drawings illustrating this embodiment:—

Figure 1 is a view in perspective showing several parts of the motor in exploded relation;

Figure 2 is a similar view illustrating in exploded relation the several parts and the associated coil which go to make up the alternating field stator structure for the synchronous rotor element;

Figure 3 is a longitudinal sectional view through the assembled motor;

Figure 4 is a transverse sectional view taken on the plane of the line 4—4 of Figure 3;

Figure 5 is a view looking in the reverse direction illustrating the inner side of the induction rotor element; and Figures 6 to 9 inclusive are circuit diagrams illustrating the two stator coils of the motor connected in different relations.

The several parts of the motor are carried on a back mounting plate 11 which may be employed to mount the motor in the clock, time switch, etc. This plate is of magnetic material and constitutes part of the stator structure for the induction rotor element. A magnetic core 12 is secured to this back plate, said core comprising a rear portion 12a of relatively large diameter and a forward portion 12b of reduced diameter. A reduced neck at the rear end of the core passes through an opening in the plate 11 and has its edge peened over, as indicated at 12c, for securing the core to the plate. An axial bore 13 extending through the core receives the spindle or shaft 14 on which the rotor elements are mounted. A bearing bushing 15 is seated in a counterbore at the rear end of the bore 13 and encloses a thrust ball 16. A plug disc 17 is seated in the rear end of this counterbore, and is secured in place by peening the core 12 inwardly over said disc, as indicated at 12d. The rear end of the shaft 14 has radial bearing support in the bushing 15, and the rearwardly acting end thrust on said shaft is borne through the thrust ball 16 abutting against the end plug 17. The bearing bushing 15 acts as a cage for retaining the thrust ball 16 in place when the shaft 14 is drawn forwardly out of the core. A second bearing bushing 18 secured in the front end of the core affords a front bearing support for the shaft.

A cylindrical shell 21 is secured to the plate 11, concentrically with respect to the core 12. If desired, the shell 21 and back plate 11 might be made integral, but where made separate, one preferred manner of securing the shell to the plate is to provide rearwardly extending tongues or prongs 21a which project through slots in the back plate 11 and have their rear ends riveted over. As best shown in Figure 1, the shell 21 comprises a plurality of pairs of forwardly extending pole teeth 22, 23 arranged in circular relation. There are preferably three of these pairs of polar projections 22, 23, although a greater or lesser number may be employed if desired. The shell 21 including these pairs of poles may be cut out of tubular stock, or may be blanked out of flat stock and then rolled to its cylindrical shape. It will be observed that after the shell 21 has been secured to the back plate 11, these two elements together define a cup-shaped stator structure having the forwardly extending pole projections.

Interspersed between these pairs of pole projections are cooperating pairs of pole projections 24, 25, which are of the same diameter as the pairs 22, 23 and fit therebetween in circular relation. The latter pairs, 24, 25, are integral projections from a disc 26 which fits over the reduced core portion 12b and abuts the shoulder 12c at the end of the large core portion. It will be noted that the disc 26 with its pairs of pole projections 24, 25 forms, in effect, a second cup-shaped stator structure.

Mounted on the core 12 between the disc 26 and the back plate 11 is an electrical coil 27 which serves to create the field for the stator pole pieces 22, 23, 24 and 25. The terminal conductors 28, 29 (Figure 1) leading from this coil may be extended out of the stator structure through one of the spaces between pairs of pole extensions 22, 23. An insulating washer 31 is interposed between the coil and back plate 11, and a group of insulating washers 32, 33 and 34 is interposed between the coil and the disc 26.

Referring now to the stator construction for the synchronous rotor element, it will be observed from Figures 1 and 2 that a ring 35 is secured to the front face of the disc 26 to project forwardly therefrom. Symmetrically spaced pole teeth 36 project forwardly from the ring 35 in circular arrangement. Said ring and its pole teeth have a smaller diameter than the pole projections 24, 25, so that this smaller stator element fits within the pole projections 24, 25. Tongues or spurs 38 project rearwardly from the ring 35 and pass through slots 39 in the disc 26, being riveted over on the back side of the disc for securing the two parts together. The ring or annulus 35, together with that portion of the disc 26 extending from this annulus inwardly to the core 12, also forms, in effect, a cup-shaped stator structure. If desired, the stator member 35 might be formed with its own disc portion as an integral wall at the rear end of the ring, but the construction shown is preferable where compact dimensions are desirable.

Interspersed between the pole teeth 36 are coacting pole teeth 37, also arranged in a ring of the same diameter as the ring of teeth 36 and projecting forwardly like the latter teeth. The teeth 37 are projections from the disc 41, which is rigidly secured to the front end of the core 12, preferably by having a reduced neck on this end of the core pass through an opening 42 in the disc, the reduced neck being thereafter peened over on the outer side of the disc, as indicated at 12f. The disc 41 has scalloped recesses 43 between the pole teeth 37 in order to provide the desired magnetic spacing between the body portion of the disc and the other pole teeth 36 which lie between the pole teeth 37. It will be noted that the disc 41 and its pole teeth 37 also form a cup-shaped stator structure.

Mounted on the reduced portion 12b of the core, between the disc portion 26 and the disc portion 41, is the coil 45 which creates the magnetic field threading the pole pieces 36, 37. An insulating disc 46 is interposed between the coil 45 and the disc portion 26, and an insulating disc 47 is interposed between the coil and the front disc portion 41. Two terminal conductors, preferably in the form of thin copper ribbons 51, 52, extend rearwardly from the coil 45. The rear insulating disc 46 is provided with notches 53 to permit the rearward extension of these conductor ribbons, and the metallic disc portion 26 is provided with insulating bushings 54, in line with the notches 53, to permit the conductor ribbons to be passed through said disc portion. One or two of the insulating washers 32, 33, 34 is provided with slots 55 through which these ribbons pass, the latter then being bent outwardly at a point between two of these washers, so that the outwardly extending portions of the ribbons are confined on each side by the washers and thus insulated from the adjacent metallic parts. Each of said washers 32, 33, 34 is provided with a segmental extension 56, these being arranged in sequence to lie in the three spaces between the three pairs of pole extensions 22, 23.

It will be observed that the above described stator construction results in four sets of pole pieces, viz., a first set 22, 23; a second set 24, 25; a third set 36, and a fourth set 37. It will also be seen that these several sets are concentrically disposed, and that the extremities of all of the pole pieces lie in substantially the same transverse plane (see Figure 3). The magnetic field which traverses the first two sets 22, 23 and 24, 25 is created by the coil 27, and the magnetic field which traverses the other two sets 36, 37 is created by the coil 45.

A rotating or shifting field is set up between the first two sets of pole pieces 22, 23 and 24, 25 by mounting copper shading rings 58 in cooperative association with certain of these pole pieces. These two shading rings are duplicates, each comprising the outer solid ring portion 58a from which loops 58b extend inwardly, these loops defining arcuate openings adapted to fit over the pole pieces. The loops of both rings are placed in registry, and these loops are slipped over alternate pole pieces of the group 22, 23, 24, 25. For example, these loops may be arranged to embrace pole pieces 22 and 24 around the series for one direction of rotation, or may be arranged to embrace the pole pieces 23 and 25 for the other direction of rotation. As is well understood, these shading rings create a phase lag in the pole pieces embraced thereby, which causes the flux in these pole pieces to lag behind the flux in the adjacent pole pieces, thus setting up a shifting or substantially rotating magnetic field around the series of pole pieces, suitable for driving the induction rotor element which responds to this rotating magnetic field. The solid peripheral portion 58a of each shading ring serves primarily to mechanically join the several shading loops 58b; and, if desired, the construction may be modified by providing independent shading loops on the appropriate pole pieces.

The induction rotor element which cooperates with this rotating flux field is designated 61 in its entirety, and comprises a cup-shaped copper shell 61a, the flange 61b of which encircles the outer series of pole teeth 22, 23, 24, 25. Crimped or spun over this peripheral flange 61b is a ring 61c of magnetic metal which serves to conduct the flux from pole to pole of the group 22—25 after this flux has passed through the copper body of the rotor. The cup-shaped member 61a is preferably secured to a bearing hub 62 which is capable of rotation on the shaft 14. In the illustrated embodiment, this hub comprises a brass pinion 63 having a reduced neck extending through the rotor and riveted over on the inner side, as indicated at 64. A washer 63' may be interposed between the pinion teeth and the web of the rotor cup, and this web may have circular and radial reenforcing beads 61d formed therein. Rigidly anchored between the rotor cup and the riveted head 64 is a plate 65 from which a radial arm 66 extends, see Figure 5. The outer end of this arm is crimped over a short wad 67 of fabric, rubber or like material, the ends of which serve as bumper stops for coacting with the synchronous rotor element.

This synchronous rotor element is designated 71, and consists of a flat plate having an arcuate series of pole projections 71n extending from one end and having a like arcuate series of pole projections 71s extending from the other end. This plate is a permanent bar magnet, with the projections 71n of north polarity and the projections 71s of south polarity. A brass bushing 72 rigidly secures the rotor 71 to the shaft 14. This magnet 71 is permanently magnetized prior to its assembly in the motor. It is desirable to magnetize the same to have a high residual and coercive force, and in the preferred construction I make this magnet of cobalt steel, although it can be constructed of one of the tungsten or chromium magnet steels if desired.

Referring to Figure 4, it will be observed that the permanent magnet rotor revolves within the ring of stator poles 36, 37, with the rotor poles revolving in close proximity to the inner surfaces of said stator poles. The space between the rotor pole projections in each group 71n and 71s is such that these projections in each group will lie opposite alternate stator pole pieces. The number of stator poles in the ring of pole projections 36, 37 is so proportioned that when the north rotor poles 71n are in alignment with stator poles 36, the south rotor poles 71s are in alignment with stator poles 37. That is to say, the stator poles 36 of one polarity are diametrically opposite to the stator poles 37 of the opposite polarity. In the illustrated arrangement this is obtained by providing eleven stator poles 36 and eleven stator poles 37, although it will be understood that different numbers of stator poles and different working relations between the rotor poles and stator poles may be employed. As shown in Figure 5, the ends of the bumper strip 67 carried by the arm 66 are adapted to engage one of the transverse edges of the permanent magnet rotor 71, whereby the two rotors 61 and 71 are compelled to rotate together, but are capable of limited relative oscillation. This capability of relative oscillation enables the permanent magnet rotor 71 to fall into synchronism more readily, and without the likelihood of the induction rotor element 61 jerking the synchronous rotor element 71 through and beyond synchronous speed.

Referring to Figures 6, 7, 8 and 9, the magnetic fields created in the core 12 by the two coils 27 and 45 may be arranged to act cumulatively or in opposition, and the two coils may be connected in parallel or in series for producing either of these effects. In Figure 6 the two fields are cumulative, in that the coil 27 establishes a polarity in the intermediate portion of the core which is opposite to the polarity established in this portion of the core by the other coil 45. The two coils are shown as being connected in parallel to the source of current supply. In Figure 7, the two fields are also cumulative, but the two coils are connected in series. In Figure 8, the magnetic fields are in opposition, in that the polarity induced in the intermediate portion of the core by the coil 27 is the same as the polarity induced in this portion of the core by the other coil 45. The two coils are shown as being connected in parallel to their source of current supply in securing this differential effect. In Figure 9 the same differential effect is obtained, with the fields in opposition, but with the two coils connected in series. Any one of the above described arrangements may be embodied in the motor, but I find that the differential relation illustrated in Figures 8 and 9 results in the most satisfactory performance. Where compact dimensions of the motor are essential, it is preferable to connect the two coils together in series, as shown in Figure 9, as such permits the use of heavier gauge wire with fewer turns per coil, but it will be understood that the parallel relation illustrated in Figure 8 may be employed for securing the same magnetic relation, if desired.

It will be seen from the foregoing that the coil 27 creates a magnetic field in the ring of pole projections 22, 23—24, 25, wherein, for each alternation, the pole projections 22, 23 are of one polarity and the pole projections 24, 25 are of the opposite polarity. This field is caused to have a shifting or rotating action by the phase displacement induced by the shading rings 58, and the induction rotor 61 is caused to rotate by this field for the purpose of starting the rotor assembly. The coil 45 creates a magnetic field in the ring of pole projections 36, 37, which magnetic field is a stationary axis alternating field. On each alternation, the pole projections 36 are of one polarity and the pole projections 37 are of the opposite polarity. The standstill locking torque of the synchronous rotor 71 is overcome by the starting torque of the induction rotor 61, and the synchronous rotor is quickly brought up to a speed where it falls into synchronism with the alternating field existing in the ring of pole projections 36, 37. The permanent magnet type of synchronous rotor disclosed is characterized by the advantage of being able to go into synchronous speed automatically when brought up to a speed which is considerably lower than this synchronous speed. In some designs, this permanent magnet rotor will automatically go into synchronous step with the alternating magnetic field when the rotor is brought up to a speed of only approximately half the synchronous speed. Thus, it is not essential that the induction rotor 61 have an inherent free running speed above the synchronous speed of the synchronous rotor. That is to say, the motor of my invention has an inherent flexibility for meeting different conditions and different requirements, in that the parts may be so proportioned that the induction rotor 61 will have an inherent, free running speed either somewhat below the synchronous speed of the rotor 71, or substantially the same as this synchronous speed, or considerably above this synchronous speed. In any of these embodiments, the synchronous rotor 71 will rotate at the inherent synchronous speed established by the pole projections 36, 37 and will compel the entire rotor assembly, including the induction rotor 61, to revolve at this synchronous speed. Variations in the free running speed of the induction rotor 61, relatively to the synchronous speed of the synchronous rotor, may be effected by increasing or decreasing the number of poles 22, 23, 24, 25 relatively to the number of poles 36, 37. Furthermore, inasmuch as the rotating field established in the ring of poles 22—25 is created by a separate coil 27, it will be evident that by increasing or decreasing the number of ampere turns in this coil the starting torque of the induction rotor can be increased or decreased, and the positive or negative torque exerted by the induction rotor at the synchronous speed of the synchronous rotor can also be proportioned, as desired. Moreover, by increasing or decreasing the number of ampere turns in the other coil 45, the torque exerted by the synchronous rotor 71 at synchronous speed can be proportioned as desired.

While I have illustrated and described what I regard to be the preferred embodiment of my invention, nevertheless it will be understood that such is merely exemplary and that numerous modifications and rearrangements may be made therein without departing from the essence of the invention. For example, the two portions of the core associated with the different coils 27 and 45 might be magnetically separated, i. e., the core portion 12b might be separated from the core portion 12a by a spacing member of brass, copper or other non-magnetic material or by an air gap. In such event, the disc 26 would be mounted on the core portion 12a, and the stator annulus 35 would be provided with an end disc portion which would be mounted on the core portion 12b. The effect of the magnetic spacing would be more appreciable when the energization produced by the coils 27 and 45 was in the relation illustrated in Figures 6 and 7.

I claim:—

1. In a self-starting synchronous motor, the combination of a first stator structure comprising a first set of cooperating pole pieces defining therebetween a first air gap, a second stator structure comprising a second set of cooperating pole pieces defining therebetween a second air gap, the pole pieces of one of said stator structures embracing the other stator structure, separate coils energizing said two stator structures and enabling different flux densities to be caused to thread said two air gaps, means creating a revolving magnetic field in one of said air gaps, a rotor element having induction motor characteristics responsive to said revolving magnetic field, a permanently magnetized rotor element running as a synchronous element in response to the magnetic field in said other air gap, and means operatively coupling said rotor elements together.

2. In a self-starting synchronous motor, the combination of a first stator structure comprising a first set of cooperating pole pieces defining therebetween a first air gap, a second stator structure comprising a second set of cooperating pole pieces defining therebetween a second air gap, separate coils energizing said two stator structures and enabling different flux densities to be caused to thread said two air gaps, means creating a revolving magnetic field in one of said air gaps, a rotor element having induction motor characteristics responsive to said revolving magnetic field, a permanently magnetized rotor element running as a synchronous element in response to the magnetic field in said other air gap, one of said rotor elements embracing the other, and means operatively coupling said rotor elements together.

3. In a self-starting synchronous motor, the combination of a first stator structure comprising a first set of cooperating pole pieces defining therebetween a first air gap, a second stator structure comprising a second set of cooperating pole pieces defining therebetween a second air gap, both of said stator structures including a common core, separate coils mounted on said core, energizing said two stator structures and enabling different flux densities to be caused to thread said two air gaps, shading means coacting with one of said sets of pole pieces for creating a revolving magnetic field in the air gap defined by said latter pole pieces, a rotor element having induction motor characteristics responsive to said revolving magnetic field, a permanently magnetized rotor element running as a synchronous element in response to the magnetic field in said other air gap, and means operatively coupling said rotor elements together.

4. In a self-starting synchronous motor, the combination of a first stator structure comprising a first set of cooperating pole pieces defining therebetween a first air gap, a second stator structure comprising a second set of cooperating pole pieces defining therebetween a second air gap, the pole pieces of one of said stator structures embracing the other stator structure, a core common to both stator structures, separate coils mounted on said core, energizing said two stator structures and enabling different flux densities to be caused to thread said two air gaps, shading means coacting with one of said sets of pole pieces for creating a revolving magnetic field in the air gap defined between said latter set of pole pieces, said other set of pole pieces creating a substantially stationary axis alternating magnetic field in said other air gap, a rotor element having induction motor characteristics responsive to said revolving magnetic field, a permanently magnetized rotor element running as a synchronous element in response to said stationary axis alternating magnetic field, and means operatively coupling said rotor elements together.

5. In a self-starting synchronous motor, the combination of a first stator structure comprising a first set of cooperating pole pieces defining therebetween a first air gap, a second stator structure comprising a second set of cooperating pole pieces defining therebetween a second air gap, a core common to both of said stator structures, a first coil mounted on said core and energizing said first stator structure, a second coil mounted on said core and energizing said second stator structure, shading means coacting with one of said sets of pole pieces for creating a revolving magnetic field in the air gap defined between said latter set of pole pieces, the other set of pole pieces creating a substantially stationary axis alternating magnetic field in said other air gap, a rotor element having induction motor characteristics responsive to said revolving magnetic field, a permanently magnetized rotor element running as a synchronous element in response to said stationary axis alternating magnetic field, one of said rotor elements embracing the other, and lost motion coupling means operatively coupling said rotor elements together.

6. In a self-starting synchronous motor, the combination of a first stator structure comprising a first set of cooperating pole pieces defining therebetween a first air gap, a second stator structure comprising a second set of cooperating pole pieces defining therebetween a second air gap, said first set of pole pieces embracing said second set of pole pieces and having a lesser number of pole pieces than said second set, a first coil energizing said first stator structure, a second coil energizing said second stator structure, shading means coacting with said first set of pole pieces for creating a revolving magnetic field in said first air gap, said second set of pole pieces creating a substantially stationary axis alternating magnetic field in said second air gap, a rotor element having induction motor characteristics responsive to said revolving magnetic field, a permanently magnetized rotor element running as a synchronous element in response to said stationary axis alternating magnetic field, said first mentioned rotor element embracing said second mentioned rotor element, and lost motion coupling means operatively coupling said rotor elements together.

7. In a self-starting synchronous motor, the combination of a first stator structure comprising a first set of cooperating pole pieces defining therebetween a first air gap, a second stator structure comprising a second set of cooperating pole pieces defining therebetween a second air gap, said two stator structures comprising a common magnetic element, two coils energizing said stator structures, said coils acting differentially whereby their fields are in opposition in said common magnetic element, and a rotor structure comprising an induction rotor element and a synchronizing rotor element responsive to the magnetic fields in said two air gaps.

8. In a self-starting synchronous motor, the combination of a magnetic core, a first stator structure mounted on said core adjacent to one end thereof and comprising a first set of cooperating pole pieces defining therebetween a first air gap, a second stator structure mounted on said core adjacent to the other end thereof comprising a second set of cooperating pole pieces defining therebetween a second air gap, a first coil mounted on said core for energizing said first stator structure, a second coil mounted on said core for energizing said second stator structure, said coils being connected to act differentially whereby their fields are in opposition in said core, and a rotor structure comprising an induction rotor element and a synchronizing rotor element responsive to the magnetic fields in said two air gaps.

9. In a self-starting synchronous motor, the combination of a magnetic core, two coils mounted in longitudinally spaced relation on said core, a first disc mounted on one end of said core, a second disc mounted on the other end of said core, and an intermediate disc mounted on said core between said coils, a first set of cooperating pole pieces carried by said first disc and said intermediate disc and defining a first air gap therebetween energized by one of said coils, a second set of cooperating pole pieces carried by said second disc and said intermediate disc and defining a second air gap therebetween energized by the other of said coils, means creating a revolving magnetic field in one of said air gaps, and a rotor element comprising an induction rotor element responsive to said revolving magnetic field and comprising a synchronizing rotor element responsive to the magnetic field in the other air gap.

10. In a self-starting synchronous motor, the combination of a magnetic core, two coils mounted in longitudinally spaced relation on said core, a first disc mounted on one end of said core, a second disc mounted on the other end of said core, an intermediate disc mounted on said core between said coils, a ring carried by said intermediate disc, a first set of cooperating pole pieces carried by said first disc and by said intermediate disc and defining a first air gap therebetween energized by one of said coils, a second set of cooperating pole pieces carried by said second disc and by said ring and defining a second air gap therebetween energized by the other of said coils, shading means coacting with one of said sets of pole pieces for creating a revolving magnetic field in the air gap defined between said set of pole pieces, a rotor element having induction motor characteristics responsive to said revolving magnetic field, the other set of pole pieces creating a substantially stationary axis alternating magnetic field in the other air gap defined therebetween, a permanently magnetized rotor element running as a synchronous element in response to said substantially stationary axis alternating magnetic field, and means operatively coupling said rotor elements together.

11. In a self-starting synchronous motor, the combination of a first stator structure comprising a first set of cooperating pole pieces defining therebetween a first air gap, a second stator structure comprising a second set of cooperating pole pieces defining therebetween a second air gap, two energizing coils, one for each of said stator structures, one of said stator structures embracing both of said coils, means creating a revolving magnetic field in one of said air gaps, a rotor element having induction motor characteristics responsive to said revolving magnetic field, a synchronizing rotor element responsive to the magnetic field in said other air gap, and means operatively coupling said rotor elements together.

FREDERICK C. HOLTZ.